US012748333B2

(12) United States Patent
Chi et al.

(10) Patent No.: US 12,748,333 B2
(45) Date of Patent: Sep. 29, 2026

(54) LIGHT SOURCE MODULE AND ELECTROPHORETIC DISPLAY DEVICE

(71) Applicant: E Ink Holdings Inc., Hsinchu (TW)

(72) Inventors: Jen-Yuan Chi, Hsinchu (TW); Yu-Nan Pao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 579 days.

(21) Appl. No.: 18/163,882

(22) Filed: Feb. 3, 2023

(65) Prior Publication Data

US 2023/0280629 A1 Sep. 7, 2023

(30) Foreign Application Priority Data

Mar. 7, 2022 (TW) ................................ 111108164

(51) Int. Cl.
*G02B 26/00* (2006.01)
*F21V 8/00* (2006.01)
(Continued)

(52) U.S. Cl.
CPC ............ *G02F 1/167* (2013.01); *G02B 6/002* (2013.01); *G02B 6/0036* (2013.01); *G02B 6/0043* (2013.01); *G02B 6/0063* (2013.01); *G02B 6/0073* (2013.01); *G02F 1/133615* (2013.01); *G02F 1/133616* (2021.01)

(58) Field of Classification Search
CPC .... G02B 6/002; G02B 6/0036; G02B 6/0043; G02B 6/0063; G02B 6/0073; G02F 1/167; G02F 1/133615; G02F 1/133616
USPC .......... 349/62; 359/296; 362/559, 561, 606, 362/607, 620, 623, 626
See application file for complete search history.

(56) References Cited

U.S. PATENT DOCUMENTS 7,434,976 B2 10/2008 Sakurai et al.
9,134,475 B2 9/2015 Watanabe et al.
(Continued)

FOREIGN PATENT DOCUMENTS

CN 103900033 7/2014
CN 106896444 6/2017
(Continued)

OTHER PUBLICATIONS

"Office Action of China Counterpart Application", issued on Mar. 31, 2026, p. 1-p. 8.

*Primary Examiner* — Mahidere S Sahle
(74) *Attorney, Agent, or Firm* — JCIPRNET

(57) ABSTRACT

A light source module includes a light guide plate and a light source. The light guide plate has a first surface, a second surface, a light incident surface, and two opposite side surfaces. The second surface is opposite to the first surface, and the light incident surface connects the first surface and the second surface. Each side surface connects the first surface and the second surface, and the light incident surface connects the two side surfaces. The light source is disposed beside the light incident surface for emitting an illumination beam toward the light incident surface. The light guide plate includes multiple optical microstructures disposed on each side surface and near the light incident surface. The optical microstructures include multiple curved convex surfaces arranged from one end near the light incident surface to the other end away from the light incident surface. An electrophoretic display device is also provided.

10 Claims, 4 Drawing Sheets

(51) Int. Cl.

| | |
|---|---|
| ***G02F 1/167*** | (2019.01) |
| *G02F 1/1335* | (2006.01) |
| *G02F 1/13357* | (2006.01) |

(56) References Cited

U.S. PATENT DOCUMENTS

| | | | |
|---|---|---|---|
| 9,285,530 B2 | 3/2016 | Neugebauer et al. | |
| 10,120,120 B2 | 11/2018 | Pao | |
| 10,451,788 B2 | 10/2019 | Liao et al. | |
| 2008/0218470 A1* | 9/2008 | Miyashita | G09G 3/344 345/102 |
| 2013/0257708 A1* | 10/2013 | Wang | G02F 1/167 345/107 |
| 2014/0146563 A1 | 5/2014 | Watanabe et al. | |
| 2015/0212250 A1* | 7/2015 | Tai | G02B 6/0016 362/609 |
| 2015/0338565 A1 | 11/2015 | Pao et al. | |
| 2017/0205555 A1* | 7/2017 | Chang | G02B 6/0038 |
| 2017/0262088 A1 | 9/2017 | Wang et al. | |

FOREIGN PATENT DOCUMENTS

| | | |
|---|---|---|
| CN | 107678085 | 2/2018 |
| JP | 2004087309 | 3/2004 |
| TW | 201017291 | 5/2010 |
| TW | 201022575 A * | 6/2010 |
| TW | 368087 | 7/2012 |

* cited by examiner

LIGHT SOURCE MODULE AND ELECTROPHORETIC DISPLAY DEVICE

CROSS-REFERENCE TO RELATED APPLICATION

This application claims the priority benefit of Taiwan application serial no. 111108164, filed on Mar. 7, 2022. The entirety of the above-mentioned patent application is hereby incorporated by reference herein and made a part of this specification.

BACKGROUND

Technical Field

The disclosure relates to a light source module and a display device, and more particularly to a light source module and an electrophoretic display device.

Description of Related Art

An electrophoretic display device comes into being as display technology advances. The electrophoretic display device may serve as electronic paper, but an electrophoretic display panel itself does not emit light. Instead, various electrophoretic particles are used for different light reflection effects to generate images. To enable the electrophoretic display device to maintain viewing quality in various light environments, a light source module is developed and disposed on the electrophoretic display panel.

Generally, the light source module has a light guide plate and a light source bar disposed beside the light incident surface of the light guide plate. The light emitted by the light source bar and scattered to both sides forms a bright area on the light guide plate after total internal reflection by side surfaces of the light guide plate. On the other hand, a triangular dark area which is relatively dark is formed at the light guide plate near the light incident surface. For example, when the light guide plate uses a material with a refractive index of 1.59, a bright area is formed in an active area of the light guide plate after the light incident on the side surfaces of the light guide plate at an angle greater than 39 degrees is totally reflected by the light guide plate, while a triangular dark area that is relatively dark is formed at the light guide plate near the light incident surface as the light incident on the side surfaces of the light guide plate at an angle less than 39 degrees cannot be totally reflected, which therefore results in uneven brightness of the light source module.

One of the solutions for the triangular dark area is to dispose local high-density pattern bars at both ends of the light incident surface on the bottom surface of the light guide plate. The local high-density pattern bars can disperse the light to reduce the triangular dark area, but this causes the problem that a human eye can see bright areas appear at the two corners of the light guide plate near the light incident surface.

Another solution for the triangular dark area is to roughly polish the left and right sides of the light guide plate to frustrate total internal reflection, but this causes an excessively large light loss of, for example, more than 20%.

SUMMARY

The disclosure provides a light source module that may effectively resolve the problem of a triangular dark area and may provide an even surface light source at a low light loss.

The disclosure provides an electrophoretic display device that may effectively resolve the problem of a triangular dark area and may provide an even surface light source at a low light loss.

An embodiment of the disclosure provides a light source module including a light guide plate and a light source. The light guide plate has a first surface, a second surface, a light incident surface, and two opposite side surfaces. The second surface is opposite to the first surface, and the light incident surface connects the first surface and the second surface. Each side surface connects the first surface and the second surface, and the light incident surface connects the two side surfaces. The light source is disposed beside the light incident surface for emitting an illumination beam toward the light incident surface. The light guide plate includes multiple optical microstructures disposed on each side surface and near the light incident surface. The optical microstructures include multiple curved convex surfaces arranged from one end near the light incident surface to the other end away from the light incident surface.

An embodiment of the disclosure provides an electrophoretic display device including an electrophoretic display panel and the light source module. The light source module is disposed on the electrophoretic display panel, and the second surface of the light guide plate faces the electrophoretic display panel.

In the light source module and the electrophoretic display device of the embodiments of the disclosure, the light guide plate includes multiple optical microstructures disposed on each side surface and near the light incident surface. In addition, these optical microstructures include multiple curved convex surfaces arranged from one end near the light incident surface to the other end away from the light incident surface. Therefore, the light emitted by the light source and scattered toward both sides may be reflected by the curved convex surfaces at various angles, such that the reflected light may be evenly distributed to each area of the light guide plate near the light incident surface. In this way, the above problem of the triangular dark area may be effectively resolved to provide an even surface light source at a low light loss. In addition, it may be avoided that bright areas with excessive brightness appear at the corners of the light guide plate.

DESCRIPTION OF THE EMBODIMENTS

Figure 1A:
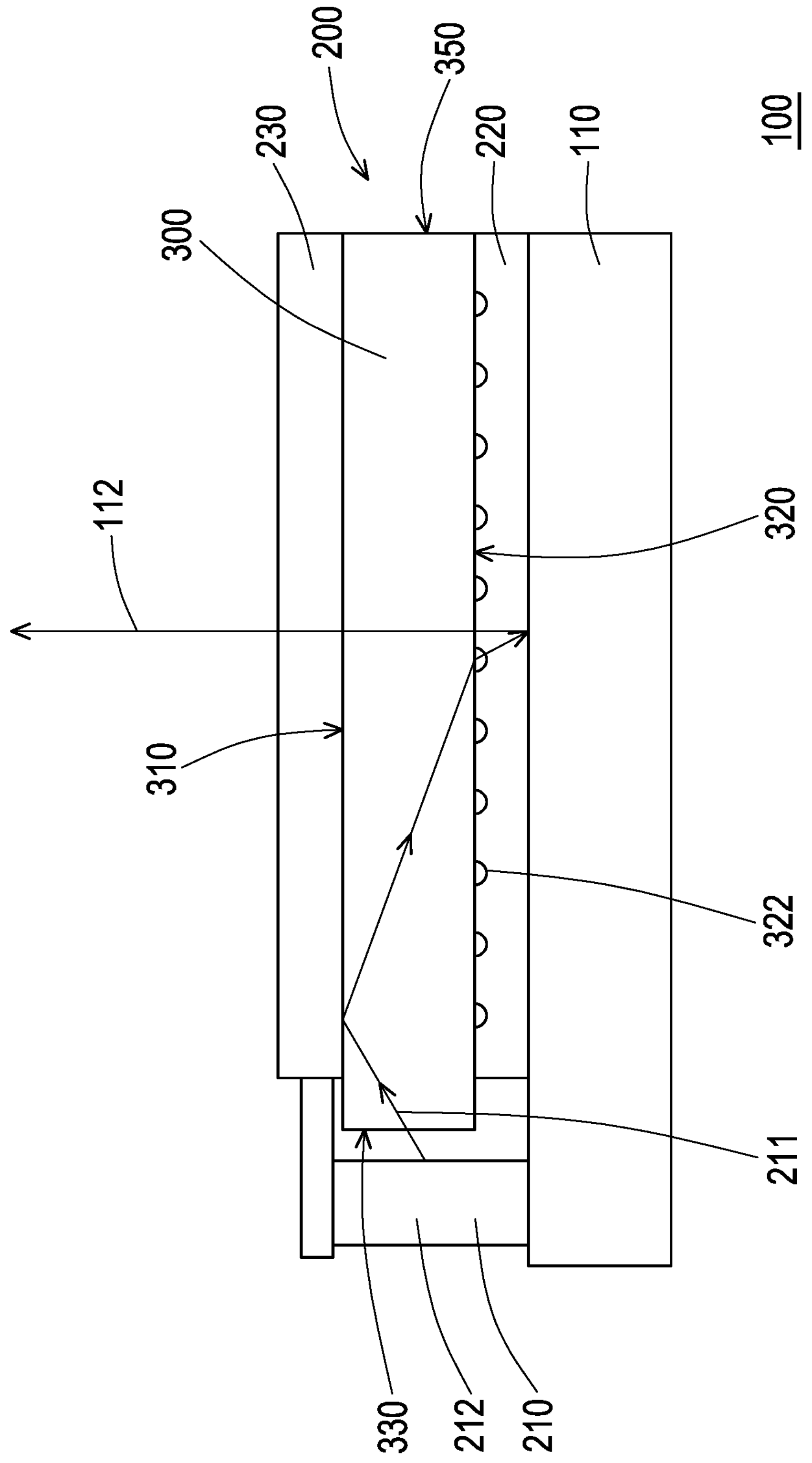
FIG. 1A is a schematic cross-sectional view of an electrophoretic display device according to an embodiment of the disclosure.
Figure 1B:
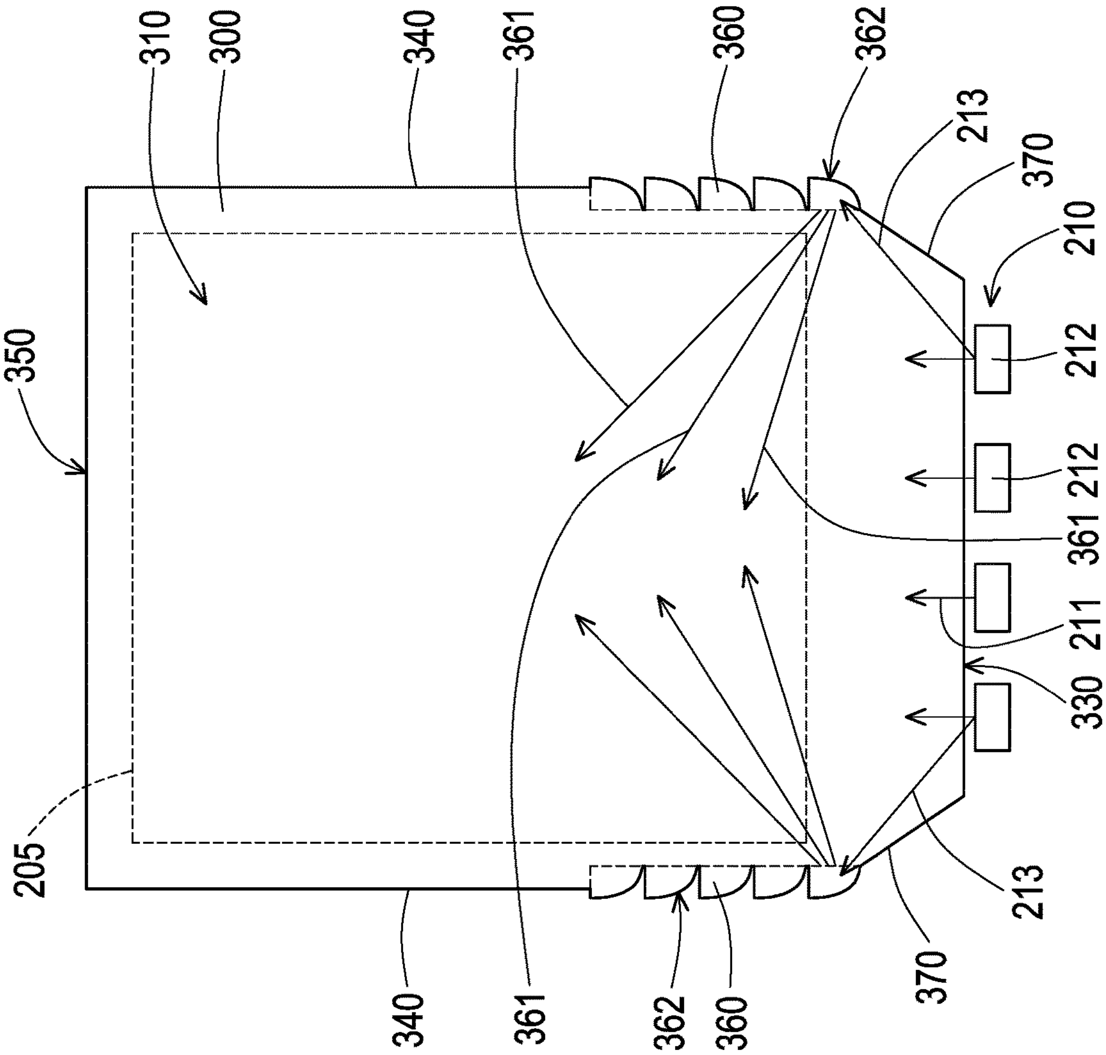
FIG. 1B is a schematic top view of a light guide plate and a light source in FIG. 1A.

FIG. 1A is a schematic cross-sectional view of an electrophoretic display device according to an embodiment of the disclosure, and FIG. 1B is a schematic top view of a light guide plate and a light source in FIG. 1A. With reference to FIG. 1A and FIG. 1B, an electrophoretic display device 100 of this embodiment includes an electrophoretic display panel 110 and a light source module 200. The light source module 200 is disposed on the electrophoretic display panel 110 and includes a light guide plate 300 and a light source 210. The light guide plate 300 has a first surface 310, a second surface 320, a light incident surface 330, two opposite side surfaces 340, and an opposite surface 350. The second surface 320 is opposite to the first surface 310 and faces the electrophoretic display panel 110. The light incident surface 330 connects the first surface 310 and the second surface 320. Each side surface 340 connects the first surface 310 and the second surface 320, and the light incident surface 330 connects the two side surfaces 340. The opposite surface 350 is opposite to the light incident surface 330, connects the first surface 310 and the second surface 320, and also connects the two side surfaces 340.

The light source 210 is disposed beside the light incident surface 330 for emitting an illumination beam 211 toward the light incident surface 330. In this embodiment, the light source 210 includes multiple light emitting elements 212 arranged in a straight line along the light incident surface 330, and the light emitting elements 212 are, for example, light emitting diodes. In other embodiments, light sources 210 may also be other suitable light sources, such as cold cathode fluorescent lamps.

In this embodiment, the light guide plate 300 further includes multiple light scattering microstructures 322 disposed on at least one of the first surface 310 and the second surface 320 (being disposed on the second surface 320 as an example in FIG. 1A). The light scattering microstructures 322 are, for example, protruding points, dented points, protruding patterns, dented patterns, or a combination thereof on the light guide plate 300. Most of the illumination beam 211 emitted by the light source 210, after entering the light guide plate 300 through the light incident surface 330, are totally reflected by the first surface 310 and the second surface 320 and are transmitted in the light guide plate 300. The light scattering microstructure 322 frustrates total internal reflection, such that the illumination beam 211 irradiating the light scattering microstructures 322 is scattered and transmitted downward to the electrophoretic display panel 110. The electrophoretic display panel 110 reflects the illumination beam 211 (for example, the electrophoretic display panel 110 has electrophoretic particles of at least two different colors to reflect the illumination beam 211) to form an image beam 112. The image beam penetrates the light guide plate 300 and is transmitted to the user's eyes, such that the user can see the image displayed by the electrophoretic display panel 110. In addition, a quality displayed image may be seen in various light environments, no light environments, or low light environments.

The light guide plate 310 includes multiple optical microstructures 360 disposed on each side surface 340 and near the light incident surface 330, and the length of the side surface 340 having the optical microstructures 360 accounts for about ⅓ to ½ of the overall length of the side surface 340. The optical microstructures 360 include multiple curved convex surfaces 362 arranged from one end near the light incident surface 330 to the other end away from the light incident surface 330, which means each optical microstructure 360 in this embodiment has one curved convex surface 362.

In the light source module 200 and the electrophoretic display device 100 of this embodiment, light 213 (i.e., part of the illumination beam 211) emitted by the light source 210 and scattered toward both sides may be reflected by the curved convex surface 362 at various angles, such that reflected light 361 may be evenly distributed to each area of the light guide plate 300 near the light incident surface 330. In this way, the above problem of the triangular dark area may be effectively resolved to provide an even surface light source in an active area 205 of the light source module 200. In addition, since most of the light 213 may be reflected by the curved convex surfaces 362, the light source module 200 may maintain a low light loss while providing the even surface light source. In addition, it may also be avoided that bright areas with excessive brightness appear at the corners of the light guide plate 300.

In this embodiment, the curved convex surface 362 may reflect the light 213 by total internal reflection or partial reflection, and the curved convex surface 362 may not be coated with a reflective film. However, in other embodiments, the curved convex surface 362 may also be coated with a reflective film to reflect the light 213. In addition, in this embodiment, an optical clear adhesive 220 may be disposed between the light guide plate 300 and the electrophoretic display panel 110, and an optical layer 230 may be disposed on the first surface 310 of the light guide plate 300. The optical layer 230 is, for example, an optical clear adhesive, a protective cover, an anti-glare layer, or a combination thereof.

Figure 2B:
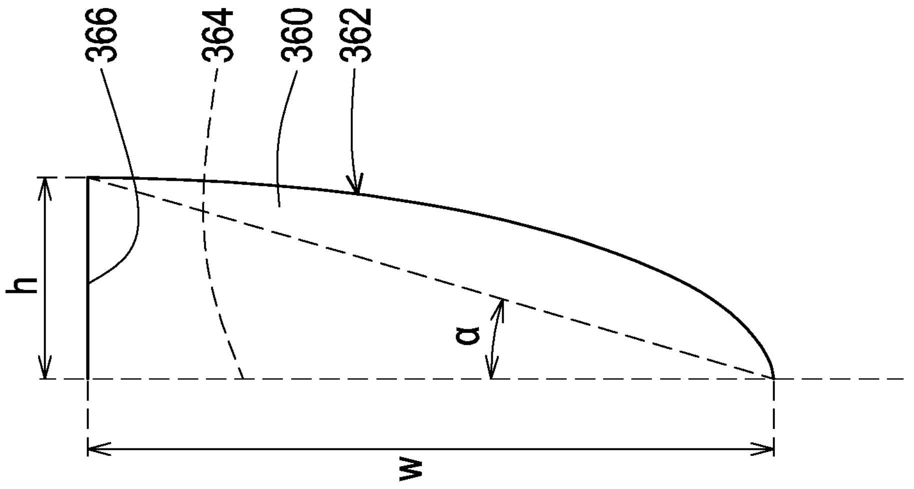
FIG. 2B is an enlarged schematic view of one optical microstructure in FIG. 1B.
Figure 2A:
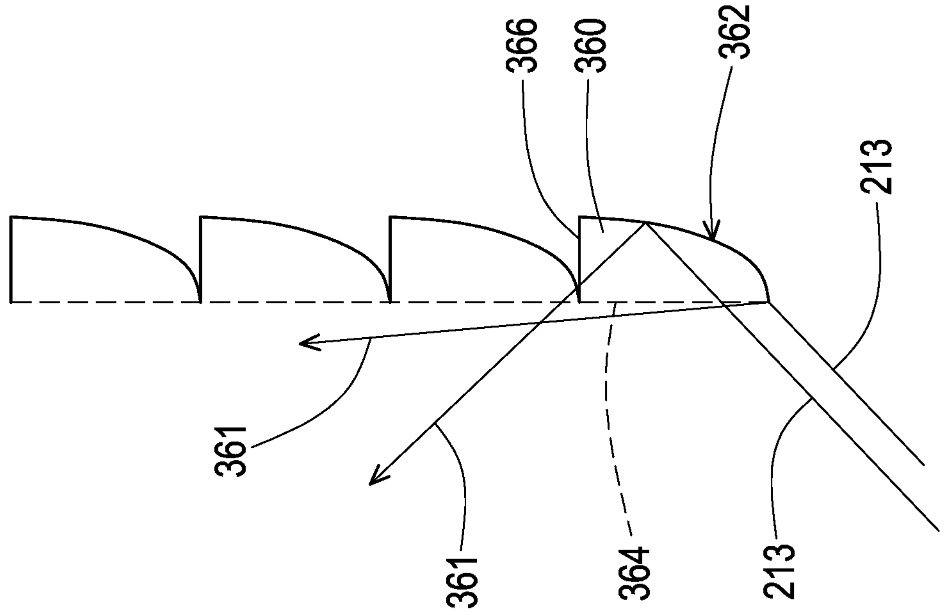
FIG. 2A is a partially enlarged schematic view of optical microstructures in FIG. 1B.

FIG. 2A is a partially enlarged schematic view of optical microstructures in FIG. 1B, and FIG. 2B is an enlarged schematic view of one optical microstructure in FIG. 1B. With reference to FIG. 1B, FIG. 2A, and FIG. 2B, in this embodiment, each curved convex surface has an inclination angle $\alpha$ relative to the normal direction of the light incident surface, and the inclination angle $\alpha$ is defined as $\arctan(h/w)$, where h is the height of the optical microstructure 360 having the curved convex surfaces 362, and w is the length of a bottom edge 364 of this optical microstructure 360. In this embodiment, the height h of the optical microstructure 360 is parallel to the light incident surface 330, and the bottom edge 364 of the optical microstructure 360 is perpendicular to the light incident surface 330. Moreover, the high h may be parallel to the first surface 310. In this embodiment, the curved convex surface 362 is curved on a plane parallel to the first surface 310 but may not be curved to extend straight in a direction perpendicular to the first surface 310. In other words, the curved convex surface 362 may be a curved strip, which means the curved convex surface 362 may be a cylindrical surface. In addition, in an embodiment, the curved convex surface 362 may be a parabola, a circular arc, a hyperbola, or other curves on a section parallel to the first surface 310. In this embodiment, the optical microstructure 360 may further include a connection surface 366 connecting the curved convex surface 362 and the bottom edge 364. In addition, in this embodiment, the light guide plate 300 may further include two connection surfaces 370 located at two corners beside the light incident surface 330 of the light guide plate 300, with each connection surface 370 connecting the light incident surface 330 and the side surface 340.

In this embodiment, $0<\alpha\leq\theta/2$, where $\theta=\arcsin(1/n)$, where n is the refractive index of the light guide plate 300. When the material of the light guide plate 300 is, for example, polycarbonate (PC), the refractive index n of the light guide plate 300 is, for example, 1.59, which makes $\theta$ to be 39° according to the above inequalities, so $0<\alpha\leq19.5°$. When the material of the light guide plate 300 is, for example, polymethylmethacrylate (PMMA), the refractive index n of the light guide plate 300 is, for example, 1.48, which makes $\theta$ to be 42.5° according to the above inequalities, so $0<\alpha\leq21.25°$.

Figure 3:
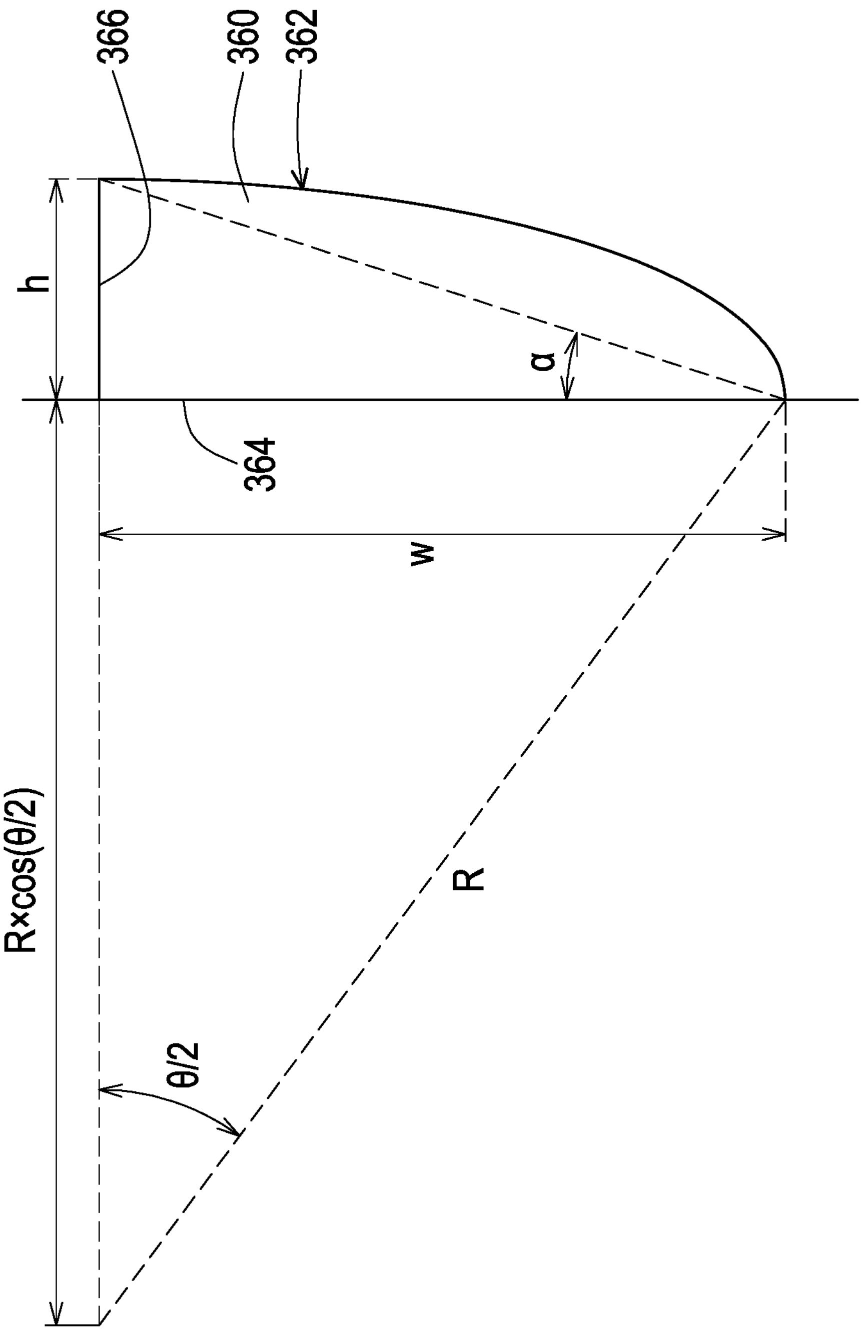
FIG. 3 is a schematic geometric view of one optical microstructure in FIG. 1B.

FIG. 3 is a schematic geometric view of one optical microstructure in FIG. 1B. With reference to FIG. 1B, FIG.

2B, and FIG. 3, in this embodiment, if a point on one side of the bottom edge 364 of the optical microstructure 360 serves as the center of a circle, and the ends of two radii R with an included angle θ/2 are respectively connected to two ends of the curved convex surface 362, then w=R×sin(θ/2) is obtained, and h=RR×cos(θ/2), so w:h=sin(θ/2):(1−cos(θ/2)) is obtained as well. In this embodiment, h ranges from 10 micrometers to 100 micrometers, and w ranges from 28.2 micrometers to 582 micrometers. For example, when the material of the light guide plate 300 is PC, the refractive index of the light guide plate 300 is 1.59, then θ/2=19.5°, and w/h=5.82. At this time, h is, for example, 20 micrometers while w is, for example, 116 micrometers.

In summary, in the light source module and the electrophoretic display device of the embodiments of the disclosure, the light guide plate includes multiple optical microstructures disposed on each side surface and near the light incident surface. In addition, these optical microstructures include multiple curved convex surfaces arranged from one end near the light incident surface to the other end away from the light incident surface. Therefore, the light emitted by the light source and scattered toward both sides may be reflected by the curved convex surfaces at various angles, such that the reflected light may be evenly distributed to each area of the light guide plate near the light incident surface. In this way, the above problem of the triangular dark area may be effectively resolved to provide an even surface light source at a low light loss. In addition, it may be avoided that bright areas with excessive brightness appear at the corners of the light guide plate.

What is claimed is:

1. A light source module, comprising:

a light guide plate, having:

a first surface;

a second surface, opposite to the first surface;

a light incident surface, connecting the first surface and the second surface; and two side surfaces that are opposite to each other, each of the side surfaces connecting the first surface and the second surface, and the light incident surface connecting the two side surfaces; and a light source, disposed beside the light incident surface for emitting an illumination beam toward the light incident surface, wherein the light guide plate comprises a plurality of optical microstructures disposed on each of the side surfaces and near the light incident surface, and the optical microstructures comprise a plurality of curved convex surfaces arranged from an end near the light incident surface to another end away from the light incident surface, wherein a length of the side surface having the optical microstructures accounts for ⅓ to ½ of an overall length of the side surface.

2. The light source module according to claim 1, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein the height of the optical microstructure is parallel to the light incident surface, and the bottom edge of the optical microstructure is perpendicular to the light incident surface.

3. The light source module according to claim 1, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein 0<α<21.25°.

4. The light source module according to claim 1, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein h ranges from 10 micrometers to 100 micrometers, and w ranges from 28.2 micrometers to 582 micrometers.

5. The light source module according to claim 1, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein w:h=sin(θ/2):(1−cos(θ/2)), wherein θ=arcsin(1/n), wherein n is a refractive index of the light guide plate.

6. The light source module according to claim 1, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein 0<α≤θ/2, wherein θ=arcsin(1/n), wherein n is a refractive index of the light guide plate.

7. The light source module according to claim 1, wherein the light source comprises a plurality of light emitting diodes arranged in a straight line along the light incident surface.

8. An electrophoretic display device, comprising:

an electrophoretic display panel; and a light source module, disposed on the electrophoretic display panel and comprising:

a light guide plate, having:

a first surface;

a second surface, opposite to the first surface and facing the electrophoretic display panel;

a light incident surface, connecting the first surface and the second surface; and two side surfaces that are opposite to each other, each of the side surfaces connecting the first surface and the second surface, and the light incident surface connecting the two side surfaces; and a light source, disposed beside the light incident surface for emitting an illumination beam toward the light incident surface, wherein the light guide plate comprises a plurality of optical microstructures disposed on each of the side surfaces and near the light incident surface, and the optical microstructures comprise a plurality of curved convex surfaces arranged from an end near the light incident surface to another end away from the light incident surface, wherein a length of the side surface having the optical microstructures accounts for ⅓ to ½ of an overall length of the side surface.

9. The electrophoretic display device according to claim 8, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein w:h=sin(θ/2):(1−cos(θ/2)), wherein θ=arcsin(1/n), wherein n is a refractive index of the light guide plate.

10. The electrophoretic display device according to claim 8, wherein each of the curved convex surfaces has an inclination angle α relative to a normal direction of the light incident surface, and the inclination angle α is defined as arctan(h/w), wherein h is a height of the optical microstructure having the curved convex surface, and w is a length of a bottom edge of the optical microstructure, wherein 0<α≤θ/2, wherein θ=arcsin(1/n), wherein n is a refractive index of the light guide plate.

* * * * *